United States Patent
Myers et al.

(10) Patent No.: US 6,874,362 B2
(45) Date of Patent: Apr. 5, 2005

(54) MASS AIR FLOW SENSOR WITH STRESS FREE SENSOR ELEMENT MOUNTING

(75) Inventors: Eric Christopher Myers, Howell, MI (US); Lawrence A. Zurek, Warren, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/437,826

(22) Filed: May 14, 2003

(65) Prior Publication Data

US 2004/0226356 A1 Nov. 18, 2004

(51) Int. Cl.$^7$ .............................................. G01F 1/68
(52) U.S. Cl. .......................... 73/204.27; 73/204.22
(58) Field of Search ........................ 73/204.22, 204.21, 73/204.27, 204.26

(56) References Cited

U.S. PATENT DOCUMENTS

| | | | |
|---|---|---|---|
| 4,471,655 A | 9/1984 | Obayashi et al. ............. | 73/204 |
| 4,517,837 A | 5/1985 | Oyama et al. ................ | 73/202 |
| 4,549,433 A | 10/1985 | Gneiss et al. | |
| 4,599,895 A | 7/1986 | Wiseman ..................... | 73/204 |
| 4,870,860 A | 10/1989 | Ohta et al. ................ | 73/204.26 |
| 4,986,123 A | 1/1991 | Lösing et al. ............. | 73/204.26 |
| 5,017,875 A | 5/1991 | Hori et al. .................... | 324/446 |
| 5,186,044 A | 2/1993 | Igarashi et al. ............ | 73/118.2 |
| 5,224,378 A | 7/1993 | Yajima et al. | |
| 5,423,213 A * | 6/1995 | Yajima ..................... | 73/204.26 |
| 6,018,994 A | 2/2000 | Yonezawa et al. ......... | 73/202.5 |
| 6,079,265 A * | 6/2000 | Wienand et al. .......... | 73/204.26 |
| 6,382,023 B1 | 5/2002 | Yonezawa et al. ....... | 73/204.22 |
| 6,427,668 B1 | 8/2002 | Igarashi et al. ............. | 123/494 |
| 6,498,481 B2 | 12/2002 | Apel ....................... | 324/207.2 |

* cited by examiner

*Primary Examiner*—Harshad Patel
(74) *Attorney, Agent, or Firm*—Brinks Hofer Gilson & Lione

(57) ABSTRACT

An air flow sensing apparatus with a plastic housing having at least two leadframes that are embedded in the plastic housing and adapted for the attachment of a sensing element whose major axis is oriented across the leadframes in a first direction such that, during a thermal cycle, the difference in relative movement between the leadframes in the first direction is minimized while the leadframes move substantially synchronously in other two directions; the leadframes being bent in a pattern that is substantially parallel to each other, and arranged in close proximity with each other, with the dimensions spacing apart the leadframes in the pattern being minimized.

10 Claims, 3 Drawing Sheets

MASS AIR FLOW SENSOR WITH STRESS FREE SENSOR ELEMENT MOUNTING

TECHNICAL FIELD

This invention relates to a mass air flow sensor in which a sensing element is mounted on leadframes located near or within a bore that is formed in the plastic housing of the sensor.

BACKGROUND

In a typical mass air flow sensor, a sensing element is attached between leadframes that are disposed within a bore or air passage that is formed within the plastic housing of the mass air flow sensor. Because the plastic of the housing expands and contracts in response to changes in the temperature of the surrounding environment, the leadframes will often move significantly relative to one another as the surrounding temperature changes. This relative movement stresses the points at which the sensing elements are attached or welded to the leadframes. Over time, the stress causes the attachment or weld points to fatigue, and ultimately, the mass air flow sensor to fail. The present invention minimizes the amount of stress on the attachment or weld points of the sensing elements due to the thermal expansion and contraction of the plastic housing by controlling the amount of plastic that is disposed between the leadframes, and by the careful placement and orientation of the leadframes.

SUMMARY

The present invention provides an air flow sensing apparatus with a plastic housing having at least two leadframes that are embedded in the plastic housing and adapted for the attachment of a sensing element. The major axis of the sensing element is oriented across the leadframes in a first direction such that, during a thermal cycle, the difference in relative movement between the leadframes in the first direction is minimized while the leadframes move substantially synchronously in other two directions. The leadframes are bent in a pattern that is substantially parallel to each other, and arranged in close proximity with each other, with the dimensions spacing apart the leadframes in the pattern being minimized. These and other aspects and advantages of the present invention will become apparent upon reading the following detailed description of the invention in combination with the accompanying drawings.

DETAILED DESCRIPTION

Figure 1:
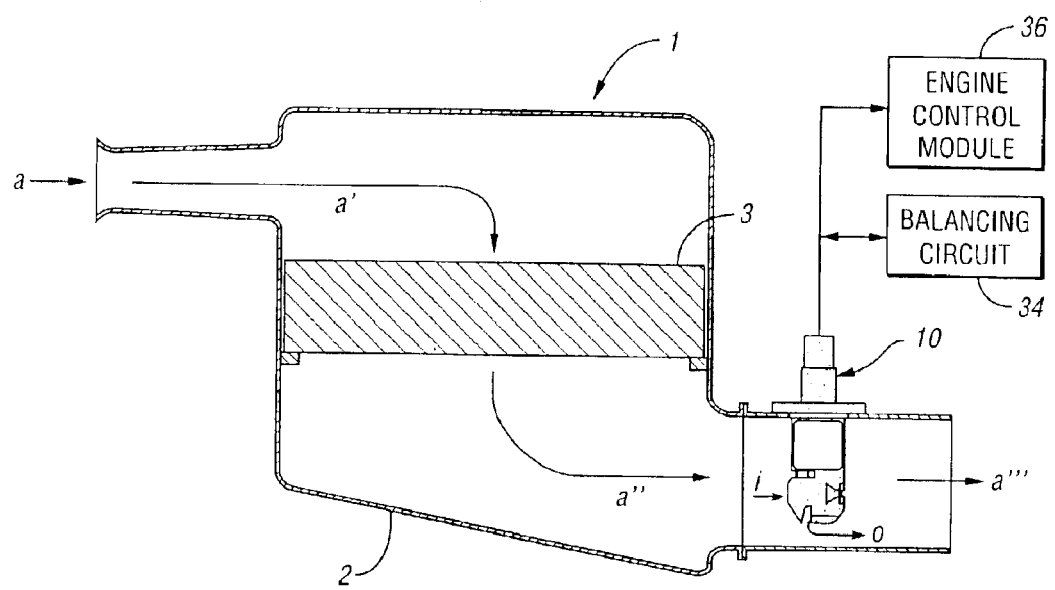
FIG. 1 is a cross sectional view of an air induction system in a motor vehicle.

Referring now to the drawings, FIG. 1 depicts an air induction system 1 of a motor vehicle configured with a mass air flow sensor 10. Ambient air (a) from outside the vehicle is drawn into a filter box 2 and is filtered through an air filter 3 housed within the filter box 2. The mass air flow sensor 10, disposed on the filtered air (a") side of the air filter 3, samples the filtered air (a") Just before It is expelled (a") into the intake manifold of the engine measuring the kilograms of air per hour that flow through the air induction system 1.

Figure 2:
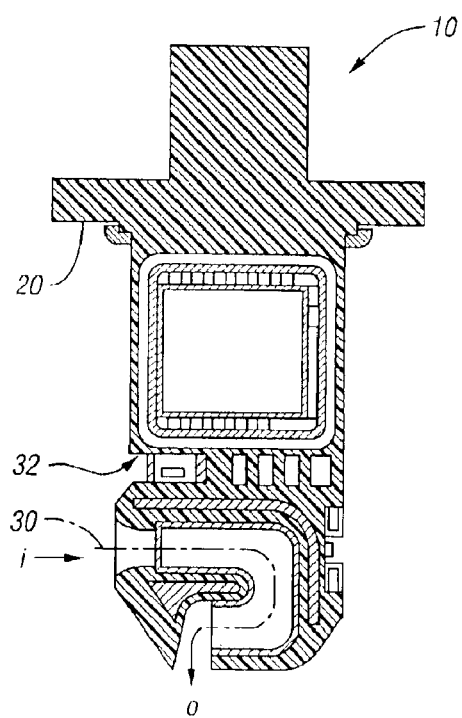
FIG. 2 is a cross sectional view of the mass air flow sensor with a plastic housing.

The preferred embodiment of the mass air flow sensor 10 is shown in greater detail in FIG. 2. The plastic housing 20 of the mass air sensor 10 is configured with two air passages 30, 32 through which the filtered air (a") flows and is sampled, an inside bore 30 that is fully enclosed and an ambient air passage 32. A sample of air "i" flows into and through the passage of the fully enclosed bore 30 and is output "O" below.

Figure 3:
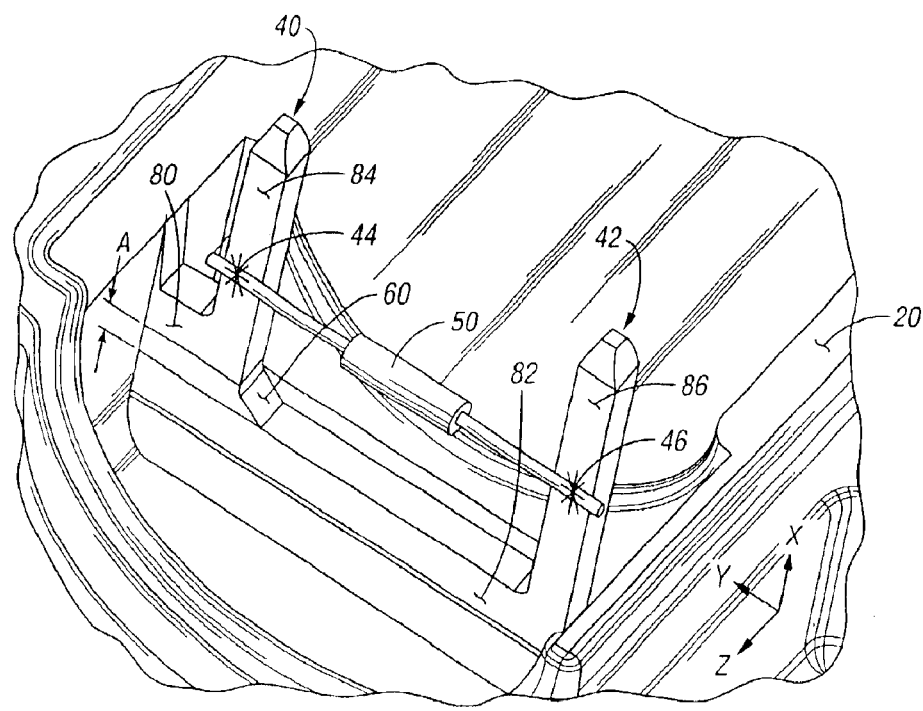
FIG. 3 is a three dimensional graphic depicting a hot wire sensing element mounted between two leadframes in a bore or air passage of the plastic housing.

In FIG. 3, two leadframes 40, 42, each formed in the shape of an "L", are shown embedded in the fully enclosed bore 30 of the plastic housing 20. In reference to a traditional Cartesian coordinate system having three perpendicular axes oriented as shown in FIG. 3, the L-shaped leadframes 40, 42 each have a base portion 80, 82 oriented along the Y axis, and an element mounting portion 84, 86 oriented along the X axis. Attached to and between the leadframes 40, 42 on the element mounting portions 80, 82 is a sensing element or hot wire element 50 that is oriented with its major axis along the Y axis perpendicular to the element mounting portions 84, 86. The sensing element or hot wire element is secured at attachment points 44, 46.

In the preferred embodiment, the material comprising the leadframes 40, 42 is stainless steel and the sensing element or hot wire element 50 is attached to the leadframes 40, 42 by welding, although various other materials for the leadframes 40, 42, and attachment methods for sensing elements 50, are well known in the industry and could be used in the present invention. In addition, although the preferred embodiment depicts two leadframes 40, 42, the present invention could also be applied to configurations having several leadframes, or to multiple pairs or sets of leadframes. The present invention could also be applied to leadframes 40, 42 having geometry that differs from the L-shaped geometry shown in the FIG. 3 but adapted to allow the attachment of a sensing element 50.

Referring now to FIG. 1, the sensing element or hot wire element 50 is a resistive element that allows the mass air flow sensor 10 to detect the mass of air flowing through the air induction system of the vehicle based on a sampling ("i") of the filtered air (a") that flows through the bore 30. The resistance of the hot wire element 50 changes as it releases heat into the sampled air ("i") flowing through the bore 30. This change in resistance is detected by a balancing circuit 34, which is in electrical communication with the hot wire element 50. The balancing circuit 34 reacts to the change in resistance detected in the hot wire element 50 by pumping current into the hot wire element 50 in an effort to maintain the temperature of the hot wire element at 200 degrees Celsius above the temperature of the ambient air (a"). The greater the mass of air flowing through the air induction system 1 the greater the amount of heat that the hot wire element 50 can dissipate into the air (a") and, as a result, the more current that is pumped into the hot wire element 50. A transfer function in the mass air flow sensor 10 converts the amount of current required to maintain the hot wire element 50 at 200 degrees Celsius to a voltage output that is detected by the engine control module 36. The change in voltage output by mass air flow sensor 10 is interpreted by the engine control module 36 as the mass of the filtered air (a") flowing through the air induction system 1 of the vehicle.

Note in FIG. 3 that the two leadframes 40, 42 are spaced apart from each other in the X direction by a layer of plastic 60 of dimension "A" disposed under the base portion of one of the leadframes 40. This layer of plastic 60 expands and contracts, according to its coefficient of thermal expansion, as the temperature of the air passing through the bore 30, and in the environment surrounding the plastic housing 20, changes. This expansion and contraction of the plastic layer 60 causes a change in the dimension "A", which in turn, causes movement of the leadframe 40 relative to leadframe 42 in the direction along the X axis.

During a thermal cycle, the attachment point 46 on the second leadframe 42 also moves in the X direction due to movement in the plastic housing 20 in which the second leadframe 42 is partially embedded, and due to the comparatively higher coefficient of thermal expansion of the stainless steel comprising the second leadframe 42 in that portion of the second leadframe 42 corresponding to dimension "A" under the first leadframe 40. As a result, the attachment or weld points 44, 46 move relative to each other in the X direction during cycles of thermal expansion and contraction, rotating the sensing element 50 along an angle from the Y axis. If the plastic housing 20 of mass air flow sensor 10 and leadframes 40, 42 are not designed with this relative movement of the leadframes 40, 42 in mind, the attachment points 44, 46 could become contorted during many cycles of expansion and contraction, or thermal shock. The attachment points 44, 46 will then fatigue causing the sensing elements 50 that are attached to them not to work properly, and the mass air flow sensor 10 ultimately to fail.

The leadframe design depicted in FIG. 3, known as the "LL" or "double L design" limits any significant difference in the travel of the two attachment or weld points 44, 46 in the YZ plane during a thermal expansion or contraction cycle. This substantially constant relative movement of the leadframes 40, 42 in the YZ plane results because the element mounting portions 84, 86 of the leadframes 40, 42 are each growing according to the same coefficients of thermal expansion in both the Y and Z directions, those attributable to the stainless steel of the leadframes 40, 42, and the plastic of the housing 20 on either side of the leadframes 40, 42. Thus, mounting the sensing element 50 across the leadframes 40, 42, with its major axis oriented along the Y axis and perpendicular to the element mounting portion 84, 86 of the leadframes minimizes any direct tensile or compressive loading of the sensing element 50 along its major the axis.

In the X direction, however, because of the introduction of the plastic layer 60 between the base portions 80, 82 of the leadframes 40, 42, and its significantly greater coefficient of thermal expansion, the first leadframe 40 will move at a significantly higher rate of travel and grow a significantly greater distance in the X direction during a thermal cycle than will the second leadframe 42. This significant difference in their travel creates stress on the attachment or weld points 44, 46.

Figure 5:
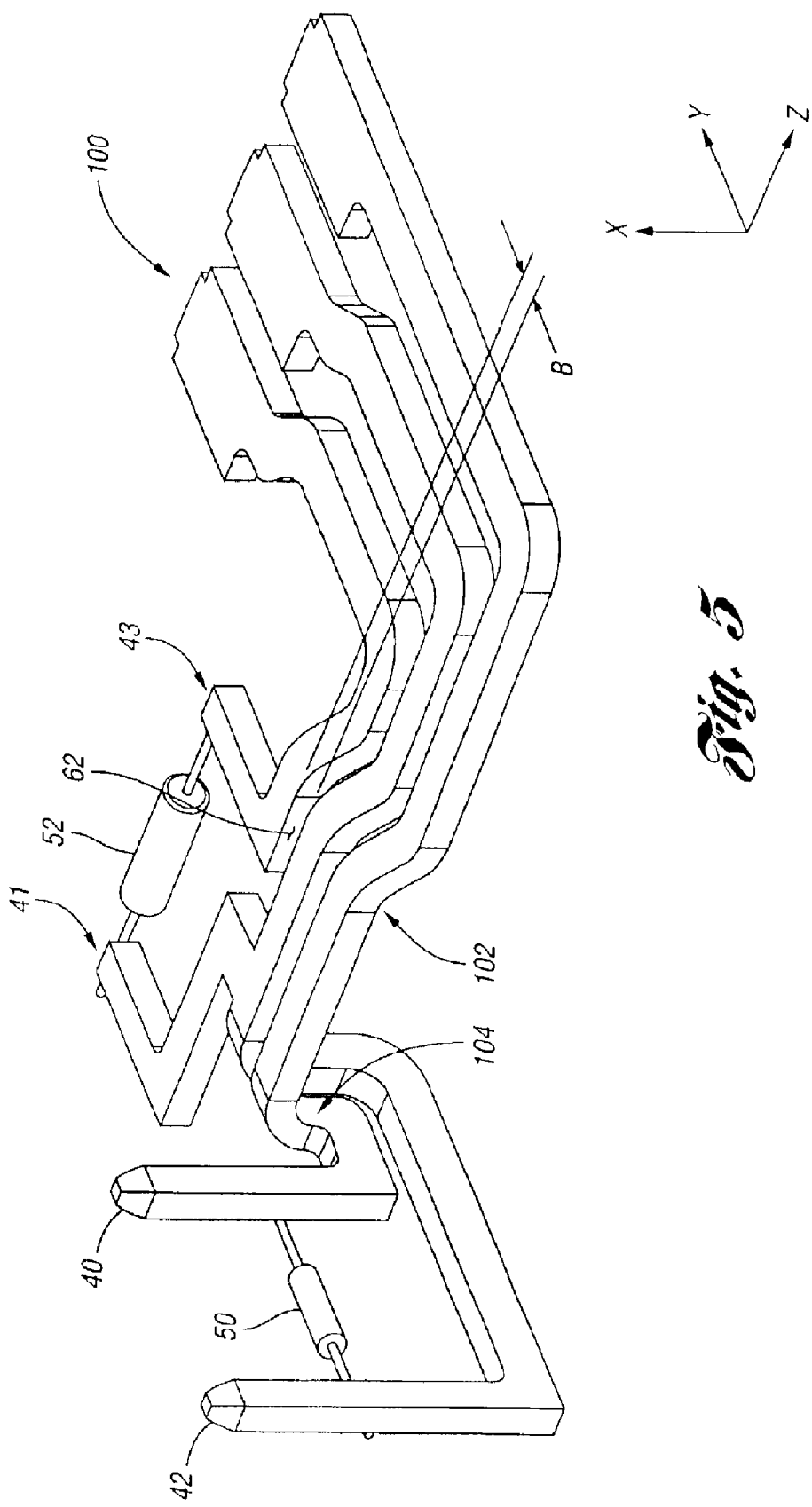
FIG. 5 is a three dimensional graphic depicting leadframe supporting network structure having multiple leads that are arranged in close proximity to each other and bent along substantially parallel paths.

The presence of the plastic layer 60 is unavoidable due to the flow characteristics of the plastic during the process of plastic injection molding used to create the housing 20 of mass air flow sensor 10 and the manufacturing tolerances applicable to the spaces in the blanking process that is used to create the supporting network structure 100 depicted in FIG. 5 with its individual leadframes 40, 42 and 41, 43. Although the limitations of the injection molding and blanking processes make it difficult to eliminate the space of dimension A between the leadframes 40, 42, the present invention minimizes the effects of the plastic's significantly greater coefficient of thermal expansion by minimizing the amount of the plastic used in the plastic layer 60 between legs of the leadframes 40, 42.

The amount of travel of the first leadframe 40 in the X direction during a thermal cycle is a function of the coefficient of the thermal expansion or contraction of the plastic comprising the plastic layer 60 and thus is a linear function that changes with temperature. A greater dimension A for the plastic layer 60 creates a greater distance of travel between the two leadframes 40, 42 and the two attachment or weld points 44, 46 during a thermal cycle, during both the expansion of a hot period and the contraction of a cold period. In the present invention, the dimension in the X direction, or the dimension A, is minimized by minimizing the amount of plastic between the base portions of the leadframes 40, 42.

In the preferred embodiment, the layer of plastic 60 of dimension A is held within the range of 0.25 to 3.00 millimeters, which is the smallest range of dimensions that are practical during the injection molding process used to form the plastic housing 20 given the viscosity and other flow characteristics of the plastic used to form the plastic housing 20 and the manufacturing tolerances applicable to the blanking process. Thus, the viscosity and other flow characteristics of the plastic are important in determining the manufacturability of the plastic housing 20. In the preferred embodiment, a thermoset plastic is used to form the plastic housing 20.

Another unique feature in the design of the present invention is the routing of the supporting network structure 100 contiguous with the leadframes 40, 42 that functions to place the sensing element 50 proximate or within the bore 30. The selection of routing path for the leadframes 40, 42 embodied within the supporting network structure 100 affects the manufacturability of the plastic housing 20 by injection molding. As seen in FIG. 2, the sensing element 50 in the present invention is located within the bore 30 at a point where the surrounding geometry tends to facilitate the laminar flow of air across the sensing element 50. To achieve this location of the sensing element 50, the leadframes 40, 42 exit the plastic of housing 20 near the top of the bore 30.

Figure 4:
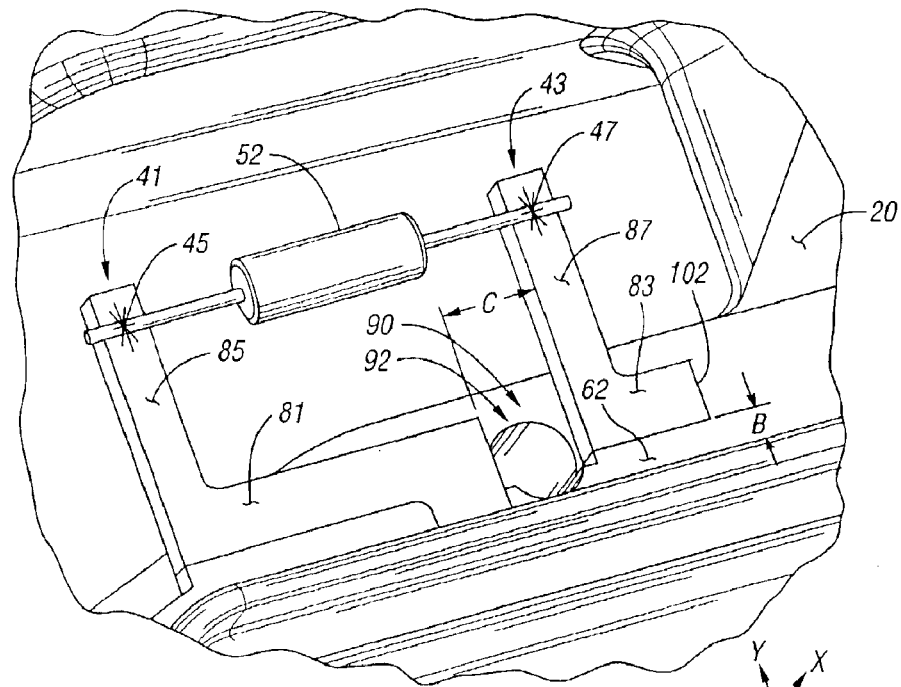
FIG. 4 is a three dimensional graphic depicting the cold wire sensing element mounted between two leadframes in a bore or air passage of the plastic housing.

Referring now to FIG. 4, the configuration for the mounting of a second sensing element, the cold wire sensing element 52, in the ambient air passage 32 of the housing 20 is shown. The cold wire sensing element 52, a high accuracy and stability temperature sensor with a high response rate to changes in temperature, sets a temperature reference level of the ambient air for the balancing circuit 34.

Although the leadframes 41, 43 employ a slightly different version of the double "L" construction that is used for mounting the hot wire sensing element 50, the cold wire element mounting scheme nevertheless retains some of the key features found in the mounting configuration for the hot wire sensing element 50. For example, both leadframes 41, 43 move substantially synchronously along the axis in the Z direction. In addition, the two leadframes 41, 43 are embedded in the plastic housing 20 such that a layer of plastic 62 of dimension "B" is disposed under the base portions 81, 83 of both of the leadframes 41, 43. The difference in the travel between the two leadframes 41, 43 along the axis in the Y direction during a thermal cycle of expansion or contraction in the local area of the attachment or weld points 45, 47 is thus eliminated through the use of a plastic layer 62 of the same dimension under both leadframes 41, 43.

The major axis of the cold wire sensing element 52 is oriented along the Z axis. The presence of a significant amount of plastic in the area 90 of dimension "C" along the Z axis would create a difference in the rate of travel between the leadframes 41, 43 during a thermal cycle that would prove particularly troublesome. Too much of a difference in the rate of travel in the Z direction in this configuration would cause direct application of tensile and compressive loading along the major axis of the cold wire sensing element 52 during a thermal cycle of expansion and contraction, and repetitive loading that would cause the sensing element 52 to fatigue over time, and the cold wire element 52, ultimately, to fail. The plastic in area 90, and therefore, the difference in the rate of travel between the leadframes 41, 43 is kept to a minimum through the use of a core pin 92 in the injection molding processing that minimizes the flow of plastic into the area 90. Thus, the mounting configuration for the cold wire element 52 is stabilized in all three directions.

FIG. 5 shows the supporting network structure 100 comprised of individual leadframes 40, 42 and 41, 43 and their routing through the plastic housing 20. The cold wire leadframes 41, 43 run along the surface of the housing 20 in plane YZ to a bend location 102 where they are displaced in the X direction and routed into the plastic of the housing 20.

Both the hot wire element leadframes 40, 42 and the cold wire element leadframes 42, 43 are spaced in close proximity, and arranged substantially parallel, to each other within the supporting network structure 100. In particular, all of the leadframes 40, 42 and 41, 43 travel along the same YZ plane and are displaced the same amount in the X direction at the same bend locations 102, 104, a scheme that maximizes their synchronous movement during the expansion and contraction experienced in any thermal cycle of the plastic of the housing 20. The correlated routing and bending, and the resulting synchronous travel, of the leadframes 40, 42 and 41, 43 during thermal cycles help to minimize any differential movement between the leadframes 40, 42 and 41, 43 that may add stress to the attachment or weld points 44, 45, and 46, 47 during a thermal cycle. The placement of the bend locations 102, 104 is chosen so as to benefit the hot wire sensing element 50 and the cold wire sensing element 52 due to the close proximity of the two sensing element 50, 52.

The dimension that the leadframes 40, 42 and 41, 43 are spaced apart within the supporting network structure 100 is again determined by the smallest dimension that is practical during the injection molding process given the flow characteristics of the plastic used to form the plastic housing 20, and the smallest tolerances that is practical during the blanking process given the finger-like projections of the leadframe 40, 42 and 41, 43 geometry that comprises the supporting network structure 100.

The preceding description of the preferred embodiment of the invention is not intended to limit the invention to this preferred embodiment, but rather to enable any person skilled in the art of mass air flow sensors to make and use this invention. As any person skilled in the art of mass air flow sensors will recognize from the previous detailed description and from the figures and claims, modifications and changes can be made to the preferred embodiments of the invention without departing from the scope of this invention defined in the following claims.

We claim:

1. An air flow sensing apparatus comprising:
   a housing at least partially formed of plastic, said plastic of said housing defining a bore;
   at least two leadframes that are at least partially embedded in said plastic of said housing, said plastic defining a layer of plastic under said base portion of a first one of said leadframes;
   a sensing element attached to each one of said leadframes with the axis of each one of said sensing elements oriented in a first direction across said leadframes;
   wherein during a thermal cycle, said leadframes move substantially synchronously in second and third directions such that the difference in relative movement between said leadframes in said first direction is minimized.

2. The apparatus of claim 1, wherein said layer of plastic is minimized to a dimension substantially in the range of 0.25 to 3.00 millimeters.

3. A method for mounting a sensing element on a leadframe of an air flow sensing device comprising the steps of:
   providing a housing at least partially formed of plastic, said plastic enclosing an air passage;
   providing at least two leadframes disposed proximate to said air passage, each said leadframe having a element mounting portion and a base portion, said element mounting portions being substantially parallel to each other in one plane;
   embedding said leadframes at least partially within said housing with said plastic being formed into a layer disposed between said base portions; and minimizing said layer of plastic to a range between 0.25 to 3.00 millimeters.

4. The method of claim 3, further comprising the step of:
   bending said leadframes in a pattern in which each of said leadframes is substantially parallel to its neighboring leadframe.

5. The method of claim 3, further comprising the step of:
   arranging said leadframes in a pattern in which they are in close proximity with each other.

6. The method of claim 5, further comprising the step of:
   spacing apart said leadframes in said pattern such that the dimensions between said leadframes in said pattern is minimized.

7. An air flow sensing apparatus comprising:
   a housing at least partially formed of plastic; and
   at least two leadframes that are at least partially embedded in said plastic of said housing such that a layer of said plastic of the substantially the same dimension is disposed under said base portions of each of said leadframes, said leadframes adapted for attaching a sensing element thereto;
   wherein during a thermal cycle, said leadframes move substantially synchronously in all three directions.

8. The apparatus of claim 7, wherein said layer of plastic is minimized to a dimension substantially in the range of 0.25 to 3.00 millimeters.

9. A method for mounting a sensing element on a leadframe of an air flow sensing system comprising the steps of:
   providing a housing at least partially formed of plastic; and
   embedding at least two leadframes at least partially in said plastic of said housing,
   adapting said leadframes for attaching a sensing element thereto such that during a thermal cycle, said leadframes move substantially synchronously in all three directions,
   defining an air passage in said plastic of said housing, and
   disposing a layer of said plastic of the substantially the same dimension under said base portion of each of said leadframes.

10. The method of claim 9, further comprising the step of:
    minimizing said layer of plastic to a dimension substantially in the range of 0.25 to 3.00 millimeters.

* * * * *